Figure 1:
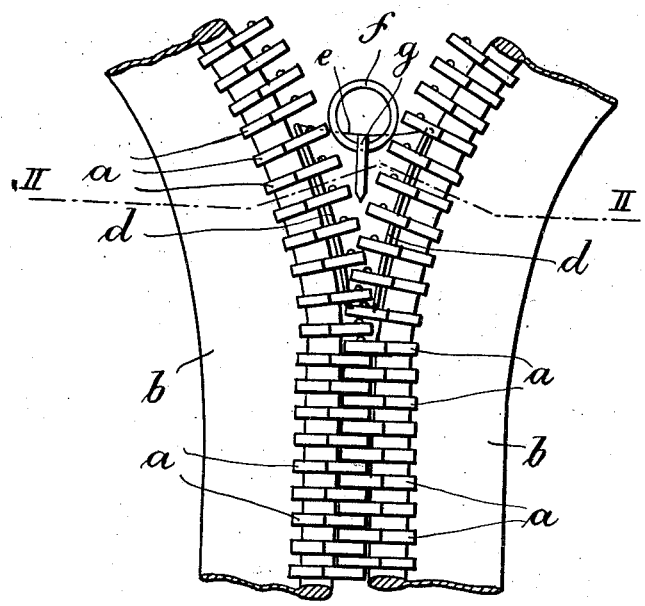

Nov. 10, 1931.  M. KRAKOWSKY  1,831,570
SLIDING FASTENER
Filed April 14, 1930

Inventor:
Moritz Krakowsky
by Karl Tuschakey
Atty.

Patented Nov. 10, 1931

1,831,570

UNITED STATES PATENT OFFICE

MORITZ KRAKOWSKY, OF OFFENBACH-ON-THE-MAIN, GERMANY

SLIDING FASTENER

Application filed April 14, 1930, Serial No. 444,090, and in Germany July 8, 1929.

My invention relates to sliding or separable fasteners. It is an object of my invention to provide an improved sliding cam for such fasteners.

To this end I provide recessed members in combination with a cam which is adapted to enter the recessed portions of the members.

In a preferred embodiment of my invention I provide camming ribs at the sides of the cam which are adapted to enter corresponding recesses in the members.

In sliding fasteners as heretofore designed and as described, for instance, in my co-pending application for patent in the United States, Serial No. 409,642, the sliding cam is so designed as to engage the members at either side, and as a rule the cam is equipped with plates which are guided on the inner and outer faces of the members. In this type of fastener the parts to be connected are subjected to wear by the cam and in said co-pending application I have described lugs on the members which increase the depth thereof so that the edges of the cam will not interfere with the parts to be connected. This solution, although it eliminates the wear, is still open to improvement as it is comparatively complicated, increases the cost and necessitates a considerable overall depth of the fastener. Besides, the lower face of the fastener may cause damage to adjacent parts when it is moved.

These drawbacks are eliminated according to my invention in which the cam is not mounted on, but within the members and is practically invisible.

A cam according to my invention is not a hollow part of considerable depth, as in the fasteners referred to, but a flat plate which, as mentioned, may be equipped with camming ribs at the sides. A cam of this type is much smaller and also much simpler than the cams referred to without in any way sacrificing reliability. On the contrary, the reliability of the cam is increased as it is protected by the members which at the same time prevent damage to adjacent parts through the movement of the cam.

In the drawings affixed to this specification and forming part thereof a sliding fastener embodying my invention is illustrated diagrammatically by way of example.

In the drawings

Figure 2:
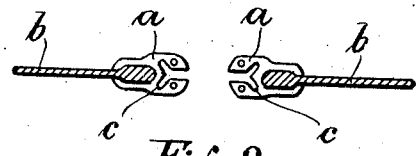
Figures 3, 4:
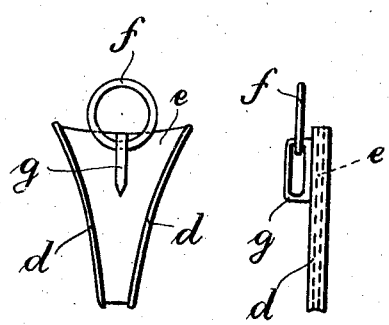
Figure 5:
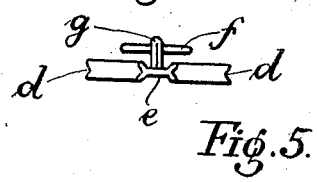

Fig. 1 is an elevation of the fastener,
Fig. 2 is a section on the line II—II in Fig. 1, with the cam omitted,
Fig. 3 is a plan view,
Fig. 4 is a side elevation, and
Fig. 5 is a front-end elevation of the cam.

Referring now to the drawings, $b$, $b$ are a pair of stringers with reinforced or beaded edges, $a$, $a$ are the locking members which are identical as to shape and are secured to the stringers $b$, $b$ in the usual manner, $c$, $c$ are recesses in the members which are adapted to receive the cam $e$, and $d$ are camming ribs at the sides of the cam $e$. In the present instance the recesses in the members $a$ and the corresponding parts at the sides of the cam $e$ have the shape of the letter Y placed horizontally. This shape has the advantage that the edges of the stringers may be in very close vicinity to the edges of the cam so that there are no appreciable gaps. However, I am not limited to the Y shape of the recesses. $f$ is a ring in a slotted rib $g$ on the cam $e$.

In operation the cam is pulled along the members $a$ by the ring $f$ and as it is moving its camming ribs $d$ move the several members $a$ as required, without separate wedging parts. The members engage each other in the usual manner and by means of the usual projections, as will appear from Fig. 1.

I wish it to be understood that I do not desire to be limited to the exact details of construction shown and described for obvious modifications will occur to a person skilled in the art.

I claim:—

1. A sliding fastener comprising two rows of interlocking members secured to opposite edges of a closure, said members being formed with recesses extending from the free ends of said members and increasing in width in the direction towards the edges of the closure, and a cam having sliding motion within said recesses for causing the engagement and disengagement of said members.

2. A sliding fastener comprising two rows of interlocking members secured to opposite edges of a closure, said members being formed with recesses extending from the free ends of said members and increasing in width in the direction towards the edges of the closure, a cam having sliding motion within said receses for causing the engagement and disengagement of said members.

3. A sliding fastener comprising two rows of interlocking members secured to opposite edges of a closure, said members being formed with Y-shaped recesses extending from the free ends of said members towards the edges of the closure and a cam having sliding motion within said recesses for causing the engagement and disengagement of said members.

In testimony whereof I affix my signature.

MORITZ KRAKOWSKY.